Dec. 9, 1947.    D. C. MURPHY    2,432,437
GRAIN SEEDING CONTROLLING DEVICE
Filed Dec. 28, 1944
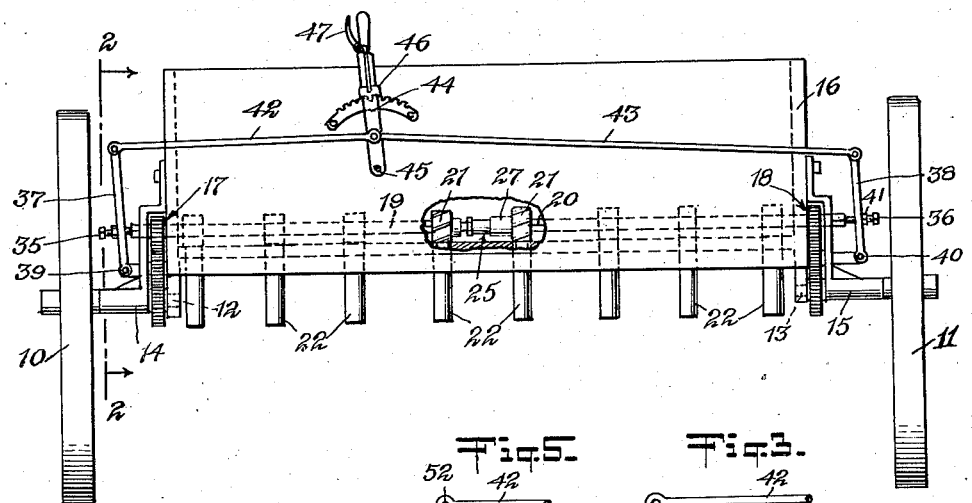
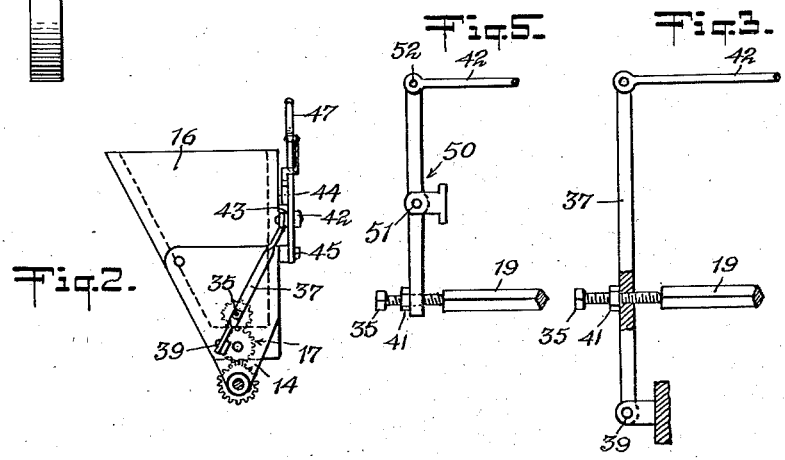
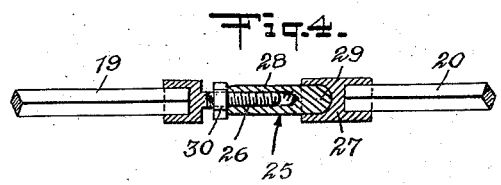
INVENTOR.
Daniel C. Murphy
BY
Attorneys Patented Dec. 9, 1947

2,432,437

UNITED STATES PATENT OFFICE 2,432,437

GRAIN SEEDING CONTROLLING DEVICE

Daniel C. Murphy, Scobey, Mont.

Application December 28, 1944, Serial No. 570,089

4 Claims. (Cl. 222—274)

This invention relates to grain seeding controlling devices.

The principal object of the invention is to provide an adjusting means for grain seeding machines which maintains the different operating parts of said machines in perfect alignment at all times.

Another object of the invention is to provide an adjusting mechanism for grain seeding machines which would permit adjusting the several operating parts of said machine to compensate for wear.

A further object is the provision of an adjusting mechanism of the character described for use in connection with standard grain seeding machines of all types.

These and other objects are attained by mechanism shown in the accompanying drawing in which—

Fig. 1 is a front view of the mechanism as applied to a standard grain seeding machine;

Fig. 2 is a sectional view on the line 2—2 of Fig. 1;

Fig. 3 is a detailed view of one of the adjusting levers of the mechanism;

Fig. 4 is an enlarged longitudinal section of the differential coupling or joint of the feed roll shafts of the mechanism; and Fig. 5 is a detailed view of an alternate form of adjustment lever which may be used in place of the adjustment lever shown in Fig. 3.

Referring now to Fig. 1, the standard grain seeding machine therein shown comprises a pair of wheels 10 and 11 fixedly mounted on individual axles 12 and 13 respectively, which axles are rotatably mounted in bearing brackets 14 and 15 respectively, said brackets being affixed in the usual manner to the said box or hopper 16. Gear trains 17 and 18 are operatively connected respectively to axles 12 and 13 and operatively connected to said gear trains are standard feed roll shafts 19 and 20 respectively, on which are mounted conventional fluted feed rolls 21. Immediately below said feed rolls are standard feed cups or chutes 22 which are mounted in the usual way on the bottom of the hopper.

It will be seen in Fig. 4 that feed roll shafts 19 and 20 are square in cross sectional shape and that they are spaced from each other at their near ends. Differential joint or coupling 25, which serves as a spacer as well as a swivel coupling, joins and spaces said feed roll shafts 19 and 20. Said differential unit 25 comprises a stud 26 which is fixedly mounted on the end of feed roll shaft 19 and a socket member 27 which is fixedly mounted on the end of feed roll shaft 20, said stud carrying an adjustable internally threaded member 28 having a ball shaped end 29 which said socket member 27 receives and engages. A lock nut 30, on said stud 26, locks said internally threaded member 28 in place.

It will be seen in Fig. 1 that the far ends of feed roll shafts 19 and 20 are engaged, respectively, by adjusting screws 35 and 36 which are carried by levers of the second class 37 and 38 said levers being pivoted to the sides of the hopper 16 at 39 and 40 respectively. Locking nuts 41 lock said adjusting screws in place with respect to said levers 37 and 38.

The free ends of levers 37 and 38 are pivotally connected to adjusting rods 42 and 43, respectively, said rods being pivotally connected at their free ends to a control lever 44 which, in turn, is pivotally connected at 45 to the hopper. Said control lever and hopper body are provided with an adjustable ratchet mechanism 46 controlled by a pivoted hand grip 47 which permits of locking said control lever in any predetermined position.

An alternate form of end lever is shown in Fig. 5, said lever performing the same function as lever 37. It is, however, a lever of the first class instead of the second class, which lever 37 happens to be. The lever shown in Fig. 5 is designated with the number 50. It is pivoted to the side of the hopper at 51 and to the adjusting rod 42 at 52. Adjusting screw 35 is fixed to it at its lower free end.

The adjusting mechanism above described may be used as follows:

Let it be assumed that feed roll shafts 19 and 20 have been moved out slightly to the right or slightly to the left of where they are required to be in order that the feed rolls 21 may be in full and perfect alignment with feed cups or chutes 22. Locking nuts 41 are loosened and adjusting screws 35 and 36 are adjusted to compensate for the disalignment of said feed roll shafts 19 and 20. Lock nuts 41 are then tightened and the mechanism is ready for use. Should it be found, however, that there is disalignment between the said rolls and the said cup or chute by reason of the fact that the feed roll shafts were not spaced properly relative to each other, then locking nut 30 is loosened and internally threaded member 28 is adjusted with respect to stud 26. Locking nut 30 is thereupon tightened and again the mechanism is ready for use. It should be noted at this point that the reason for incorporating a swivel type of mechanism between feed roll shafts 19 and 20 is that these shafts do not always rotate upon their respective axes at a constant rate of speed. For example, when the grain seeding machine reaches the end of the field and is there turned around to face in the opposite direction, wheels 10 and 11 thereof will rotate at considerably different rates of speed—the inner wheel rotating relatively slowly and the outer wheel rotating at a relatively fast rate of speed. In view of the hook-up as above described between said wheels and said feed roll shafts, it is plain that a corresponding speed differential between said feed roll shafts will be caused by the speed differential of the wheels. Control lever 44 is, of course, manipulated in the usual way to take the feed rolls out of alignment with the feed cups or chutes or to bring them into alignment with said cups or chutes. It is clear that the above described embodiment is but a preferred embodiment of the invention and that changes may be incorporated therein without departing from the basic principles of the invention. It is equally clear that what has been shown and described herein is a simple attachment for standard equipment which will, at all times, keep said equipment in perfect alignment.

I claim:

1. An adjustable seeding mechanism comprising a plurality of feed chutes, a pair of independently rotating, axially aligned feed roll shafts, an axially adjustable differential coupling connecting the adjacent ends of said shafts, and a lever construction for positioning said shafts relative to the feed chutes, said lever construction being in contact with the opposite ends of said shafts by means of axially adjustable connecting members.

2. An adjustable seeding mechanism comprising a plurality of feed chutes, a pair of independently rotating, axially aligned feed roll shafts, an axially adjustable swivel coupling connecting the adjacent ends of said shafts, and a lever construction for positioning said shafts relative to the feed chutes, said lever construction being in contact with the opposite ends of said shafts by means of axially adjustable screw members.

3. An adjustable seeding mechanism comprising a plurality of feed chutes, a pair of independently rotating, axially aligned feed roll shafts, a combination swivel and spacer connecting the adjacent ends of said shafts, said combination swivel and spacer comprising ball end and socket swivel members and an axially adjustable screw member engaging said ball end member, and a lever construction for positioning said shafts relative to the feed chutes, said lever construction being in contact with the opposite ends of said shafts by means of axially adjustable screw members.

4. An adjustable seeding mechanism comprising a plurality of feed chutes, a pair of independently rotating, axially aligned feed roll shafts, an axially adjustable swivel coupling connecting the adjacent ends of said shafts, said swivel coupling comprising a socket member on one of said adjacent ends, an internally threaded member having a ball-shaped end which engages said socket, and a screw member on the other of said adjacent ends which engages said internally threaded member, and a lever construction for positioning said shafts relative to the feed chutes, said lever construction being in contact with the opposite ends of said shafts by means of axially adjustable screw members.

DANIEL C. MURPHY.